United States Patent [19]

von Bagh

[11] Patent Number: 5,191,633
[45] Date of Patent: Mar. 2, 1993

[54] CONNECTOR FOR OPTICAL FIBER PREFORMS

[75] Inventor: Hans-Karl von Bagh, Porvoo, Finland

[73] Assignee: Nokia Kaapeli Oy, Helsinki, Finland

[21] Appl. No.: 842,111

[22] PCT Filed: Aug. 9, 1990

[86] PCT No.: PCT/FI90/00191
§ 371 Date: Mar. 20, 1992
§ 102(e) Date: Mar. 20, 1992

[87] PCT Pub. No.: WO91/04950
PCT Pub. Date: Apr. 18, 1991

[30] Foreign Application Priority Data
Oct. 5, 1989 [FI] Finland ................................. 894727

[51] Int. Cl.[5] .............................................. G02B 6/36
[52] U.S. Cl. ...................................... 385/147; 385/53; 65/1
[58] Field of Search ...................... 385/53, 55, 56, 58, 385/75, 76, 77, 147; 65/1, 3.11, 3.12, 3.15, 4.2, 4.21, 4.3, 268, 293

[56] References Cited

U.S. PATENT DOCUMENTS

| | | | |
|---|---|---|---|
| 4,347,069 | 3/1982 | Haney et al. | 65/3.12 |
| 5,113,035 | 5/1992 | Wittmann et al. | 65/3.11 X |
| 5,131,936 | 7/1992 | Cognolato et al. | 65/1 X |

Primary Examiner—Frank Gonzalez
Attorney, Agent, or Firm—Ladas & Parry

[57] ABSTRACT

This invention relates to a connector to be used in the production of optical fibre preforms for connecting a process steam and gas supply pipe (1) rotatably to a silica tube (2) to be formed into a preform. To provide a structurally simple, rotating connection, the connector of the invention comprises a generally cylindrical body part (3) provided with a through-going bore for the supply pipe (1), said bore comprising one or more annular expansions for a ring seal or ring seals (6, 7) sealing the supply pipe (1) with respect to the body part (3). One end of the body part (3) is expanded to form an abutment for a ring seal (5) sealing the body part (3) against the inside of the silica tube (2), the connector further comprising a tightening means (8, 10) for pressing the ring seal (5) sealing the body part with respect to the silica tube (2) against its abutment to expand the seal radially.

2 Claims, 1 Drawing Sheet

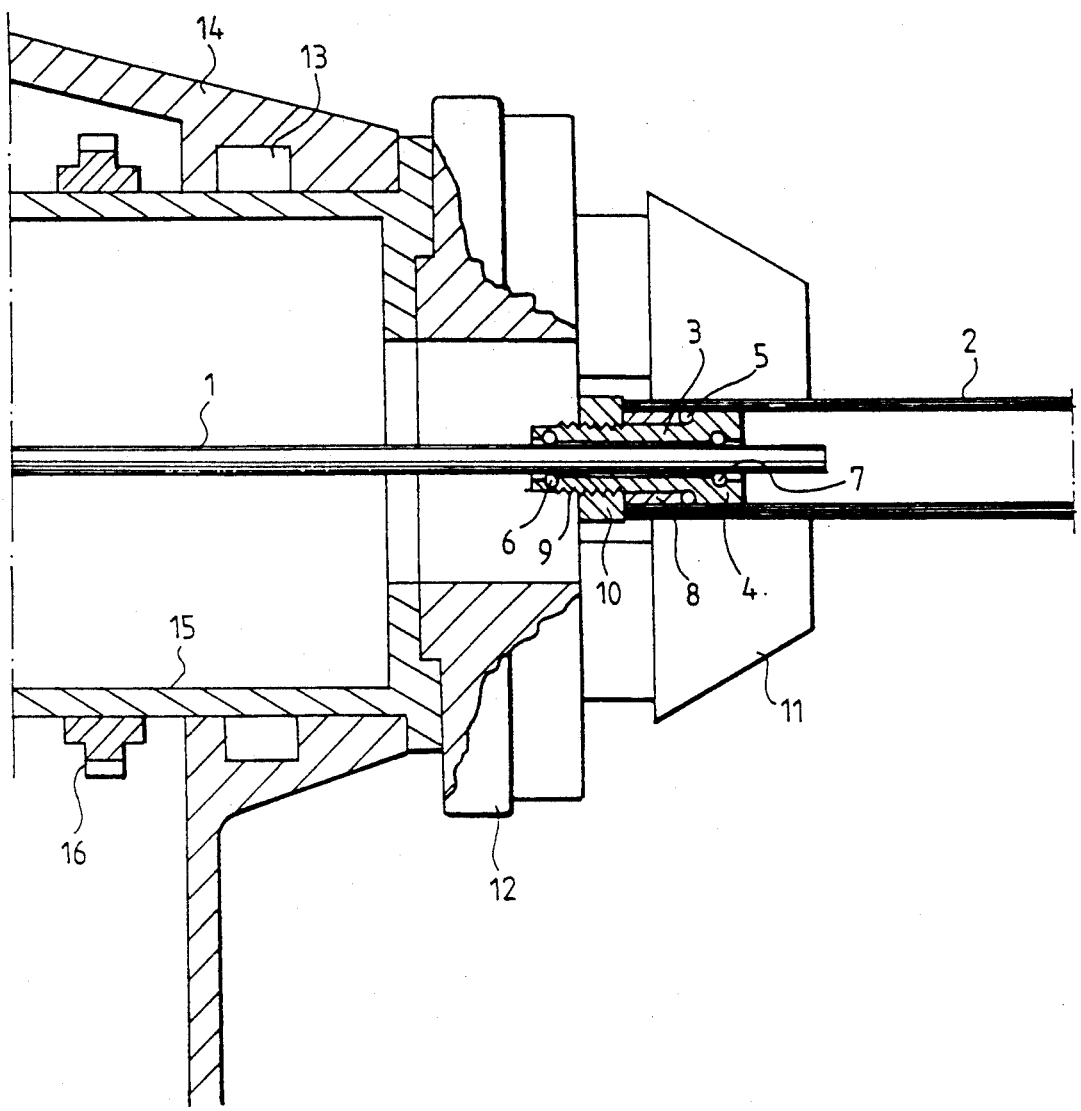

CONNECTOR FOR OPTICAL FIBER PREFORMS

BACKGROUND OF THE INVENTION

This invention relates to a connector to be used in the production of optical fibre preforms for connecting a process steam and gas supply pipe rotatably to a silica tube to be formed into a preform, comprising a generally cylindrical body part provided with a through-going bore for the supply pipe, said bore comprising one or more annular expansions for a ring seal or ring seals sealing the supply pipe with respect to the body part.

When producing optical fibre preforms e.g. by MCVD process, in which the preform is grown inside a silica tube, it is necessary to provide a rotating connection between a pipe supplying process steam and gases, usually a pipe of stainless steel, and a silica tube to be formed into a preform. In a conventional arrangement the silica tube itself is first supported between the jaws of a so-called lathe rotating it. This takes place at a distance from the end of the silica tube. The process steam and gas supply pipe is attached to the end of the silica tube by means of a suitable connector allowing rotation. When the silica tube is supported in this way to the lathe rotating it, the rotating connection is subjected not only to rotary motion but also to axial and radial forces. For this reason, it has been necessary to provide the process steam and gas supply pipe with a bellows allowing these movements; on the other hand, the structure of the connector has been relatively complicated. Further, this way of supporting the silica tube means that the silica tube portion between the supporting jaws and the rotating connection cannot be utilized. Due to the high price of silica tube, this involves a substantial waste of material.

SUMMARY OF THE INVENTION

The object of the present invention is to provide a connector which eliminates the above-mentioned problems. The connector of the invention is characterized in that one end of the body part is expanded to form an abutment for a ring seal sealing the body part against the inside of the silica tube, the connector further comprising a tightening means for pressing the ring seal sealing the body part with respect to the silica tube against its abutment to expand the seal radially. Preferably the tightening means comprises a sleeve arranged to slide on the body and a nut to be screwed on an outer thread formed on the other end of the body part.

When using the connector of the invention, the silica tube can be clamped between the jaws of the lathe rotating it in the area of the connector, since the connector is now supported to the inner surface of the silica tube. So the provision of a rotating connection does no longer require extra length from the substrate tube. Due to this way of support, the connection of the invention is not subjected to vibration, whereby the vibration cannot deteriorate its tightness. In addition, the process steam and gas supply pipe does no longer need to be provided with means allowing flexing.

DESCRIPTION OF THE DRAWING

In the following the connector of the invention will be described in greater detail with reference to the attached drawing, in which the FIGURE shows a connection between a supply pipe provided with a connector of the invention and a silica pipe when fitted in a lathe rotating the silica tube.

DETAILED DESCRIPTION OF THE PREFERRED EMBODIMENT

The FIGURE shows a rotating connection of the invention between a pipe supplying process steam and gases and a silica tube 2 to be formed into an optical fibre preform. The outer surface of the silica tube 2 is clamped in a conventional way between jaws 11 of a lathe rotating the tube. The jaws 11 can be clamped around the outer surface of the silica tube 2 by turning a clamping part 12 attached to them. The jaws 11 with their clamping part 12 are supported rotatably by means of bearings 13 to a lathe body 14. The rotary motion of the jaws 11 is effected, e.g., by chain drive through teeth 16 provided on a frame portion 15 connected to the jaws.

The connector of the invention is positioned at the end of the silica tube 2 immediately adjacent to the clamping jaws 11. This is possible since the connector is supported to the inner surface of the silica tube 2. The connector comprises a generally cylindrical body part 3 with a through-going bore for the supply pipe 1. The bore comprises two annular expansions for ring seals, usually O ring seals 6 and 7, which seal the pipe 1 against the body part 3. The ring seals both support and seal the pipe 1 with respect to the body part 3, whereas they do not prevent the turning of the pipe 1 with respect to the body part 3. The rotating connection of the invention is positioned between the ring seals 6 and 7 and the pipe 1. Since the outer surface of the pipe 1 is smooth and no axial movement occurs in the connection, the ring seals 6 and 7 are not exposed to wear in any greater degree. One end portion of the body part 3 is inserted within the silica tube 2. This end portion is provided with an expansion 4 the outer diameter of which corresponds substantially to the inner diameter of the tube 2. With respect to the rest of the body part 3, this expansion 4 forms an abutment against which a ring seal, usually an O ring seal 5, can be positioned. When inserting the body part 3 within the silica tube 2, the ring seal 5 seals the body part 3 with respect to the inner surface of the silica tube 2. To keep the body part 3 reliably in position in the axial direction of the silica tube 2, the connector of the invention is also provided with a tightening means which presses the ring seal 5 against its abutment, thus expanding the seal radially so that the body part 3 is locked axially with respect to the inner surface of the silica tube 2. In the embodiment of the FIGURE, this tightening means comprises a cylindrical sleeve 8 with smooth inner and outer surface, and a nut 10 pressing the sleeve 8 against the ring seal 5. The nut is thereby arranged to be screwed on an outer thread formed on the outer surface of the other end of the body part, that is, on the end portion protruding from the silica tube. When the nut 10 is tightened, the sleeve 8 thus slides towards the seal 5 and compresses it axially, thus expanding it radially so that the body part 3 is locked and sealed with respect to the inner surface of the silica tube 2.

The connector of the invention has been described above by means of its one exemplifying embodiment. It is to be understood that the connector can be modified without deviating from the above-described operating principle and the scope of protection defined in the attached claims. Accordingly, the tightening means, for instance, by means of which the connector is tightened within the silica tube 2, may be of a slightly different structure than that described above. The nut and the sleeve could be integral with each other. Further, the tightening means need not necessarily be pressed against the seal ring by means of the thread between the body part and the tightening means. For instance, it is possible to use a suitable handle or eccentric structure which is supported to the body part so that it can be rotated about an axis transverse to the axial direction of the body part.

I claim:

1. A connector to be used in the production of optical fibre preforms for connecting a process gas and steam supply pipe (1) rotatably to a silica tube (2) to be formed into a preform, comprising a generally cylindrical body part (3) provided with a through-going bore for the supply pipe (1), said bore comprising one or more annular expansions for a ring seal or ring seals (6, 7) sealing the supply pipe (1) with respect to the body part (3), characterized in that one end of the body part (3) is expanded to form an abutment for a ring seal (5) sealing the body part (3) against the inside of the silica tube (2), the connector further comprising a tightening means (8, 10) for pressing the ring seal (5) sealing the body part with respect to the silica tube (2) against its abutment to expand the seal radially.

2. A connector according to claim 1, characterized in that the tightening means comprises a sleeve (8) arranged to slide on the body part (3) and a nut (10) arranged to be screwed on an outer thread (9) formed on the other end of the body part.

* * * * *